(No Model.) 3 Sheets—Sheet 1.
H. SCHULZE-BERGE.
MANUFACTURE OF PLATE GLASS.
No. 305,716. Patented Sept. 23, 1884.
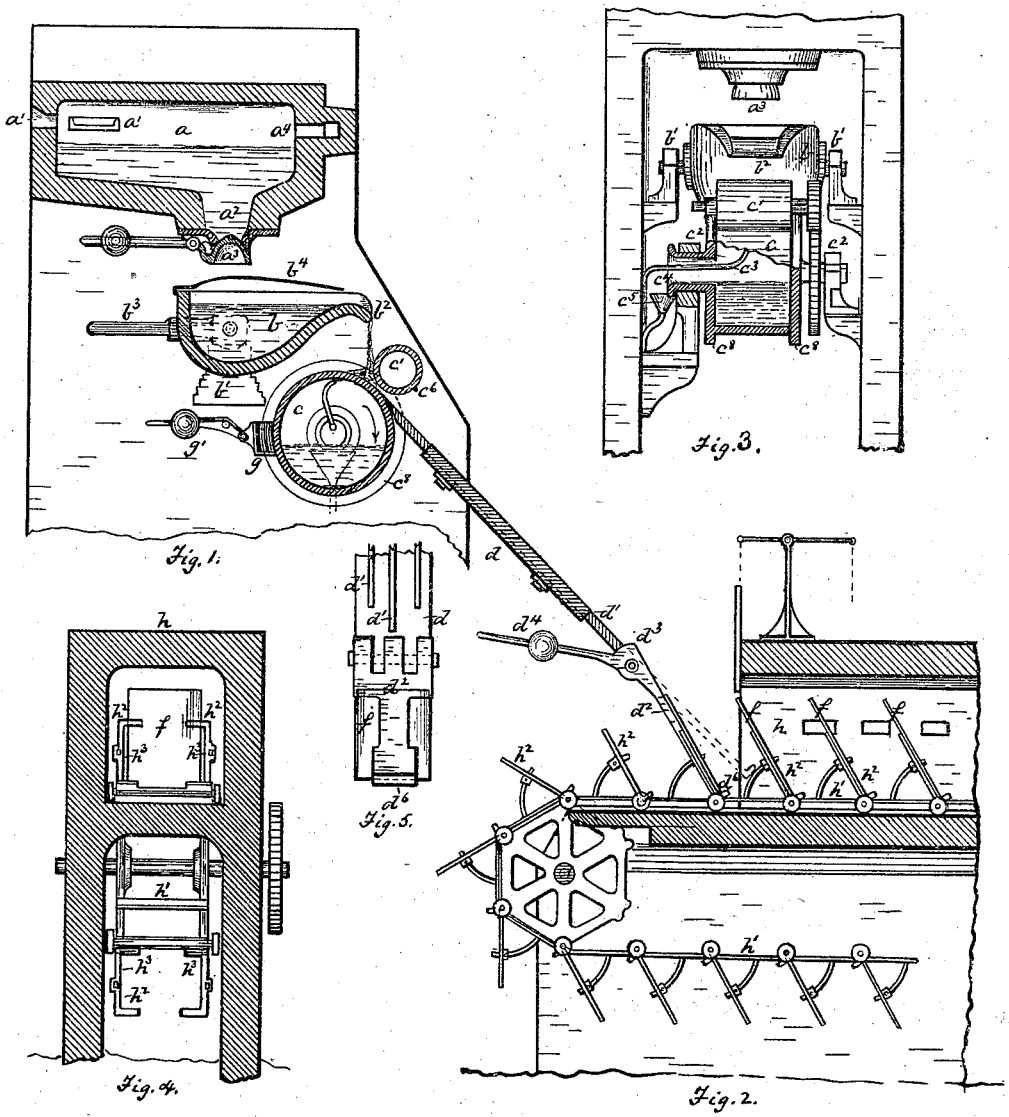
WITNESSES:
INVENTOR
Hermann Schulze-Berge
BY Bakewell & Kerr
ATTORNEYS (No Model.)
H. SCHULZE-BERGE.
MANUFACTURE OF PLATE GLASS.
No. 305,716.　　　　　　　　Patented Sept. 23, 1884.
3 Sheets—Sheet 2.
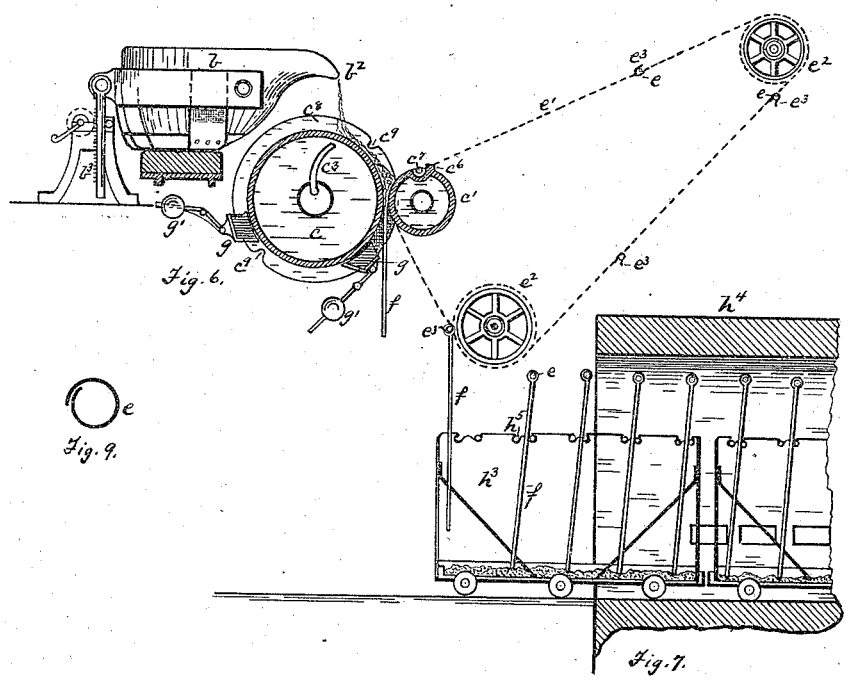
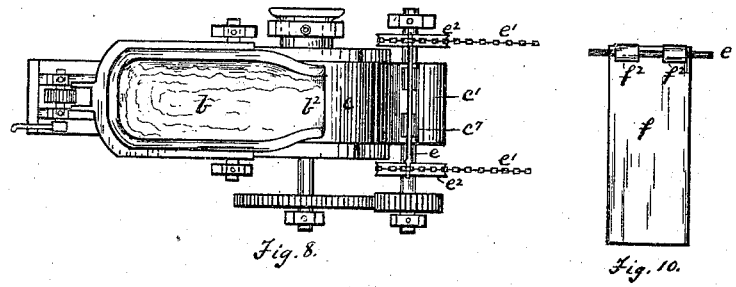
WITNESSES:
INVENTOR
Hermann Schulze-Berge
BY Bakewell & Kerr
ATTORNEYS (No Model.)  
3 Sheets—Sheet 3.

H. SCHULZE-BERGE.
MANUFACTURE OF PLATE GLASS.

No. 305,716. Patented Sept. 23, 1884.

WITNESSES:

INVENTOR
Hermann Schulze-Berge
BY Bakewell & Kerr
ATTORNEYS

UNITED STATES PATENT OFFICE.

HERMANN SCHULZE-BERGE, OF ROCHESTER, PENNSYLVANIA.

MANUFACTURE OF PLATE-GLASS.

SPECIFICATION forming part of Letters Patent No. 305,716, dated September 23, 1884.

Application filed June 19, 1884. (No model.)

*To all whom it may concern:*

Be it known that I, HERMANN SCHULZE-BERGE, of Rochester, in the county of Beaver and State of Pennsylvania, have invented a new and useful Improvement in the Manufacture of Plate-Glass; and I do hereby declare the following to be a full, clear, and exact description thereof.

In the manufacture of plate-glass, a certain quality is produced which, although translucent, is not so bright, smooth, and clear as window-glass. It is known as "rolled plate-glass," and is used for roofing, skylights, hallways, green and hot houses, and other purposes.

My present invention relates more particularly to improvements in the manufacture of glass plates for such purposes.

To enable others skilled in the art to make and use my invention, I will now describe it by reference to the accompanying three sheets of drawings, in which—

Figure 11:
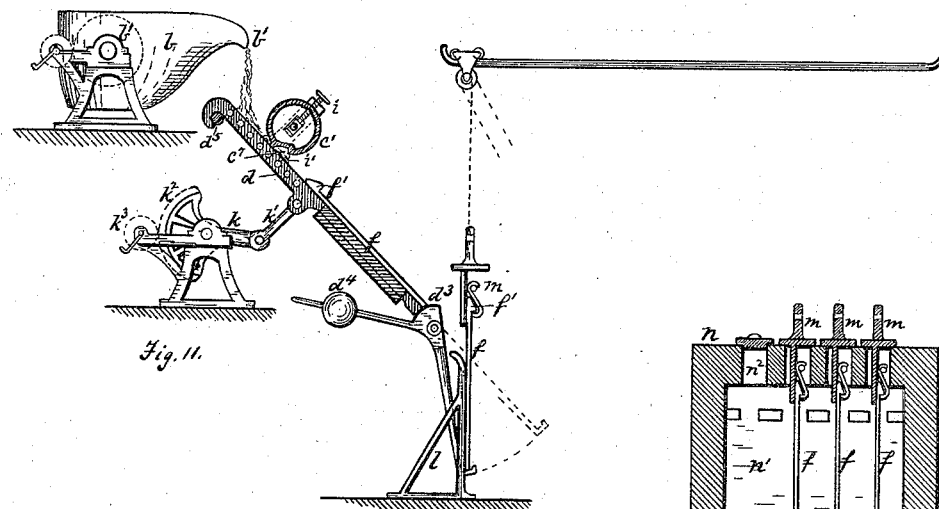
Figure 12:
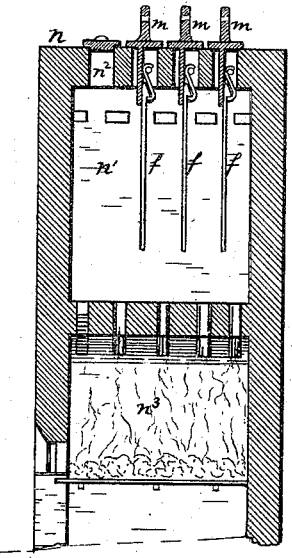
Figure 13:
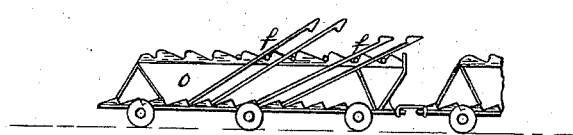

Figure 1 is a vertical section of one form of my improved appliances, showing the glass-tank, pouring-ladle, and forming-rolls, shown in connection with an annealing-oven and devices for transferring the plates from the rolls to the oven. Fig. 2 is a vertical longitudinal section of the annealing-oven. Fig. 3 is a front elevation of the pouring-ladle and rolls, one of the latter being shown partly in section. Fig. 4 is a vertical cross-section of the annealing-oven shown in Fig. 2. Fig. 5 is a detail of construction. Fig. 6 is a side view of the ladle, showing a modified form of rolls in cross-section, with another form of transferring devices. Fig. 7 is an annealing-oven shown in connection with Fig. 6. Fig. 8 is a plan view of the ladle and rolls shown in Fig. 6. Figs. 9 and 10 are details of construction. Fig. 11 is a view of the ladle with an inclined table and a single forming-roll. Fig. 12 is a vertical cross-section of a reheating-oven. Fig. 13 is a view of the carriage of an annealing-oven.

Like letters of reference indicate like parts in each.

I provide a suitable tank, $a$, Fig. 1, for containing the molten glass, which it receives from one or more melting-furnaces through feed-openings $a'$, and which it discharges through an opening, $a^2$, controlled by a stopper, $a^3$, into a pouring-ladle, $b$, placed below it. The ladle $b$ is journaled in stationary bearings $b'$, and is provided with a pouring spout or nose, $b^2$, a handle, $b^3$, and a removable lid or cover, $b^4$, the latter to prevent the too rapid cooling of the molten glass.

Journaled in suitable bearings, $c^2$, Fig. 3, are two forming-rolls, $c$ and $c'$, the pass of which is directly below the end of the pouring-spout of the ladle, so that the glass shall fall therefrom into the same. The rolls are shown as of different diameters. They may, however, be the same; but their surface-speed should be the same, or nearly so. They are constructed of metal, and are hollow to allow for the passage through them, in any suitable manner, of a cooling medium, such as water, steam, air, or other suitable fluid. As shown in Figs. 1 and 3, in connection with the roll $c$, water enters by pipe $c^3$ through the hollow journal $c^4$, and is discharged into the interior of the roll, whence it passes by flowing out through the journal $c^4$ into the discharge-funnel $c^5$. The roll $c'$ is provided with cutter or creaser $c^6$, which, acting against the surface of the roll $c$, severs the sheet of glass which is formed by the rolls into plates of the desired size. As shown, this creaser is fixed on the face of the roll; but it may be arranged in the periphery of the roll, if desired, and be projected therefrom at the desired interval, say at every revolution or at every second or third revolution of the same. This would be for the purpose of making various-sized plates with the same roll; or, if desired, the roll may be provided with several creasers, so that more than one plate could be made at each revolution.

The operation of this part of my improvement is as follows: The molten glass having been fed into the tank, where it may be kept in proper condition by a gas-flame through the opening $a^4$ or otherwise, a sufficient quantity to fill it is discharged into the ladle $b$, which is tipped by means of the handle $b^3$, so as to pour it into the pass of the rolls. The rolls roll it out into a sheet of the proper thickness, which is divided into plates of the desired size by the cutter $c^6$. In the construction shown in Figs. 1 and 3, these plates, which are of uniform thickness, pass down onto an inclined table, $d$, by means of which they are transferred, one by one, to an annealing-oven. In Figs. 6 and 8 the roll $c'$ has a concave recess, $c^7$, immediately in front of the cutter $c^6$, to receive rods $e$, which, in passing through the rolls, become embedded in the glass and form means for handling the same, so that they may be conveyed to the annealing-oven, or suspended in the reheating-furnace shown in Fig. 12. In Fig. 11 the roll $c'$ is also provided with a recess or groove, $c^7$, in front of the cutter; but this is not to receive a rod, as in Fig. 6, but to form a bead, $f'$, on one edge of the plate $f$, by which it can be conveyed to and suspended in the annealing-oven or reheating-furnace. One of the rolls, $c$, is provided with wide flanges $c^8$, and the other roll works inside of such flanges.

I prefer to coat the peripheries of the rolls with platinum, iridium, gold, silver, or kindred metal or alloys thereof, which do not oxidize by contact with air, for the purpose of producing a better polish on the surface of the glass plates than is possible with plain cast-iron rolls.

In Figs. 1 and 6, $g$ indicates a buffer of felt, leather, wood, bristles, or other suitable material, for applying carbonaceous matter, preferably powdered graphite, to the surface of the cylinder $c$. The buffer is held against the cylinder by means of the pivoted weighted lever $g'$, or it may be held in contact therewith by any other suitable means. Carbonaceous matter may also be applied to the roll $c'$ in like manner.

The application of the carbonaceous matter not only prevents the injurious action of the air upon the surfaces of the rolls when of iron or other oxidizable material, but it also enables gases to be generated by the combustion of the carbonaceous matter when it comes in contact with hot glass passing through the rolls, which is of importance, because the gases serve as a lubricating medium, producing a clearer surface on the glass plates.

Recurring now to Sheet 1, the plates pass from the rolls to a table, $d$, which is inclined sufficiently to cause the plates to slide down it of their own weight. To facilitate this movement wooden boards or strips $d'$ may be let into or fastened to the frame of the table. The hot plates sliding over the table cause the boards to char, and evolve gases which act as a lubricating medium. The lower end of the table is provided with a hinged flap, $d^2$, which, when in line with the table, presents no obstacle to the descent of the plates, but when thrown back out of line projects its upper edge, $d^3$, above the surface of the table, so that it acts as a stop to check the descent of the plate. The flap has a weighted arm, $d^4$, which preserves it while empty in line with the surface of the table; but when a plate, $f$, slides down upon the flap it swings back out of line and delivers the plate on one of the inclined supports $h^2$ of the traveling carriage $h'$ of the annealing-oven $h$. The oven $h$ has an endless chain, $h'$, provided with inclined carriers $h^2$, which, after passing through the annealing-chamber and being relieved of their loads at the other end, return through a lower chamber to the front end and into position to receive the plates from the flap $d^2$, which, when relieved of a plate, returns to its normal position.

In Figs. 6, 7, and 8 the rods $e$ are carried into position to be embedded in the edges of the plates $f$ by two chains, $e'$, which pass around three sprocket-wheels, $e^2$, each. The rods are placed in hooks $e^3$, which hold them when between the upper wheels, $e^2$, but discharge them when passing around the lower wheels. The rods are longer than the width of the plates, as shown in Fig. 10, and the chains $e'$ turn on wheels $e^2$ outside of the ends of the rolls $c\ c'$, the flanges of the latter being recessed, as at $c^9$, to permit their passage. The plates are dropped by the hooks $e^3$ on the carriage $h^3$ of the oven $h^4$, Fig. 7, the bottom of which is covered with several inches of sand to receive and protect the plates. Here they are supported by cross-rods $h^5$, placed in notches in the carriage.

The rods $e$ are formed of thin metal, and are curved, as shown in Fig. 9, so as to be compressible when the glass shrinks in cooling, and thereby to guard against fracturing the plates. The groove $c^7$ is preferably made in such shape as to form two separate lugs, $f^2$, around the rods $e$, as shown in Fig. 10.

In the construction shown in Fig. 11 the cylinder or roll $c$ is dispensed with, and the roll $c'$ is mounted in adjustable bearings $i$, in a frame, $i'$, on the table $d$, and acts in connection with the table, to roll plates of any desired thickness, such thickness being determined by the adjustment of the roll $c'$, which is effected by means of the adjusting-screws $i^2$. In this case the table $d$ is pivoted at $d^5$, and is provided with a pivoted lever, $k$, connected thereto by a link, $k'$, operated by a geared segment and pinion, $k^2\ k^3$, for the purpose of giving the table any desired inclination. Lighter plates require the table to have a steeper inclination than is necessary for the heavier ones, and the construction just described is designed to regulate the inclination of the table to suit the thickness of the plate made thereon. Arranged below the hinged flap $d^2$ is a braced post or standard, $l$, which, as the flap swings out of line with the table under the weight of the plate, causes its upper end to be retained in a vertical position, and thus be raised off the flap, as shown in Fig. 11, so that it may be caught by a suitable clamp, $m$, which hooks under the bead $f'$, formed on its upper edge, and thereby be raised up and placed in the chamber $n'$ of the reheating-oven $n$. The top of the oven is provided with a series of slots, $n^2$, of sufficient width to permit the plates $f$ to be inserted into them, which slots will be covered by the flange $m'$ of the clamp. The oven $n$ is provided with a suitable fire-chamber, $n^3$, and the plates hanging in the chamber $n$ are there exposed to a temperature which causes the surface to soften or slightly fuse, which imparts to them a brighter surface and greater clearness. They are then removed and placed on a carriage, o, Fig. 13, of an annealing-oven, into which they are run for the purpose of annealing them. If desired, the oven n may be used for annealing purposes, or the plates may be suspended in an annealing-oven in the same manner as shown in Fig. 12. The advantage of this manner of reheating and of annealing is that the plates are not in contact with any hard surface, and are therefore not liable to become distorted, while they are equally heated on all sides. The plates shown in Fig. 10 may be suspended in like manner in a reheating or in an annealing oven for treatment therein.

That part of the table which is opposite to the roll $c'$ in Fig. 11 is provided with pipes or channels for the passage of water or other cooling medium. The flap $d^2$ is provided at its lower end with a stop, $d^6$, upon which the plate $f$ rests when it slides down, and it is narrower than the plate, as shown in Fig. 5, so that the flap may pass between the arms $h^3$ of the inclined carrier $h^2$ as it swings back under the weight of the plate and leaves the plate resting thereon, as shown in Fig. 4.

The construction of the tank $a$ with provision for maintaining the temperature of the glass, and the regulated discharge-opening $a^2$, and the relative arrangement of the tank, pivoted ladle $b$, and rolls $c$, enable the molten glass to be delivered to the rolls from time to time in the requisite quantity and without loss of time or reduction of temperature, so that the operation may be carried on as slowly or rapidly as may be desired or necessary without danger of loss of stock or of producing defective plates.

What I claim as my invention, and desire to secure by Letters Patent, is—

1. The combination, in apparatus for rolling plate-glass, of a receiving-tank for containing the molten glass, provided with means, substantially as described, for keeping it fluid, and a regulated discharge-opening, with a pivoted pouring-ladle arranged below the same, and forming-rolls arranged below the pouring-ladle, whereby the molten glass can be kept in proper condition and supplied in proper quantities without loss of heat to the rolls, substantially as and for the purposes described.

2. In glass-rolling machines, the combination of a forming-roll having one or more transverse recesses or grooves in its periphery, extending parallel with its axis, with an opposed forming-surface, whereby a sheet or plate of glass having transverse ribs shall be formed, substantially as and for the purpose described.

3. The combination, in an apparatus for rolling plate-glass, of a forming-roll with a cutter which operates upon the sheet against an opposed forming-surface, substantially as and for the purposes described.

4. The combination, in a machine for rolling plate-glass, of a roll with a cutter and a recess in front of the cutter for the purpose of forming a bead or beads on the end of the plate, substantially as and for the purposes described.

5. The combination, in a machine for rolling plate-glass, of a forming-roll with a buffer for applying carbonaceous matter to the face of the roll, substantially as and for the purposes described.

6. The combination, in a machine for rolling plate-glass, of a pair of forming-rolls with an inclined table arranged below the rolls, substantially as and for the purposes described.

7. The combination, in apparatus for rolling plate-glass, of forming-rolls with an inclined table arranged below the same, and having a lower or delivery end hinged thereto, which is normally in line with the table, but turns under the weight of the plate to deliver the same, substantially as and for the purposes described.

8. In apparatus for rolling plate-glass in which forming-rolls are used, a table for receiving the plates from the rolls, composed of a suitable frame having wooden boards or strips let into or secured to the same, to constitute the sliding surface upon which the plates move, substantially as and for the purpose described.

9. An apparatus for rolling plate-glass, having hollow metallic rolls coated with platinum, iridium, or similar metals or alloys, substantially as and for the purpose described.

10. In apparatus for rolling plate-glass, the combination of a forming-roll, having a transverse recess in its periphery, with sprocket-wheels and carrying-chains for carrying rods into the recess, so that when the roll acts on the molten glass in conjunction with an opposed forming-surface the rod shall be embedded in the glass which fills said recess, substantially as and for the purposes described.

11. In apparatus for rolling sheets of glass and dividing it into plates, the combination of a forming-roll, having a transverse recess in its periphery and a severing-blade back of said recess, with sprocket-wheels and carrying-chains for carrying rods into the recess, so that they become embedded in the molten glass which fills said recess, and conveying away the plates one by one as they are severed from the sheet by the action of the severing-blade, substantially as and for the purposes described.

12. In apparatus for rolling sheets of glass and severing them into plates, the combination of an inclined table which receives the plates from the rolls, having a lower end which is narrower than the plate, with the carriage of an annealing-oven, which passes under the end of the table, and is provided with carrier-racks, which encounter the edges of the plates and take them off of the end of the table, substantially as and for the purposes described.

13. In apparatus for rolling sheets of glass and severing them into plates, the combination of an inclined table for receiving the plates from the rolls, having a hinged lower end which is narrower than the plate, with a take-off rack which encounters the edges of the plate as the hinged end falls and takes the plate off of the same, substantially as and for the purposes described.

In testimony whereof I have hereunto set my hand this 15th day of May, A. D. 1884.

HERMANN SCHULZE-BERGE.

Witnesses:
W. B. CORWIN,
THOMAS B. KERR.